US006774940B1

(12) United States Patent
Ogura et al.

(10) Patent No.: US 6,774,940 B1
(45) Date of Patent: Aug. 10, 2004

(54) ELECTRONIC CAMERA APPARATUS HAVING IMAGE REPRODUCING FUNCTION AND METHOD FOR CONTROLLING REPRODUCTION THEREOF

(75) Inventors: Kazuo Ogura, Akiruno (JP); Haruhisa Takayanagi, Hamura (JP); Hiroyuki Kuriko, Fussa (JP); Kenji Yoshizawa, Ome (JP); Kazuhiro Narushima, Fussa (JP); Satoshi Tokunaga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/520,321

(22) Filed: Mar. 7, 2000

(30) Foreign Application Priority Data

Mar. 12, 1999 (JP) ............................................ 11-066846

(51) Int. Cl.[7] .............................................. H04N 5/335
(52) U.S. Cl. ................................ 348/231.99; 348/231.2
(58) Field of Search ......................... 348/231.99, 231.1, 348/231.2, 231.3, 231.7, 231.9, 220.1, 222.1; 386/125, 106, 117, 45, 46

(56) References Cited

U.S. PATENT DOCUMENTS

| | | | | |
|---|---|---|---|---|
| 5,633,976 A | * | 5/1997 | Ogino | .......................... 386/120 |
| 5,978,016 A | * | 11/1999 | Lourette et al. | ............... 348/64 |
| 6,020,920 A | * | 2/2000 | Anderson | ................. 348/222.1 |
| 6,356,306 B1 | * | 3/2002 | Kobayashi | ................... 348/322 |
| 6,512,548 B1 | * | 1/2003 | Anderson | .............. 348/333.05 |
| 2001/0043278 A1 | * | 11/2001 | Hamamura | ............ 348/333.01 |
| 2002/0018135 A1 | * | 2/2002 | Amano | ................... 348/333.01 |
| 2002/0054221 A1 | * | 5/2002 | Hamamura | ................. 348/231 |
| 2003/0122950 A1 | * | 7/2003 | Anderson | .............. 348/333.02 |

* cited by examiner

Primary Examiner—Aung Moe
(74) Attorney, Agent, or Firm—Frishauf, Holtz, Goodman & Chick, P.C.

(57) ABSTRACT

A picture number of an image to be displayed on a liquid crystal display is compared with index data contained in an index section of a work memory to produce a display signal to be delivered to the liquid crystal display by using compressed or non-compressed data which has been left in a data section of the work memory when it is determined that the compared data coincided with each other. In this condition, both of a procedure for reading out the compressed data from an image recording section and a procedure for expanding the compressed data become unnecessary in case of utilizing non-compressed data, while only a procedure for reading the compressed data from the image recording section becomes unnecessary, though a procedure for expanding the compressed data is required in case of utilizing compressed data, so that it becomes possible to remarkably increase a speed in a procedure configured to display image, whereby instantaneous reproduction of image can be improved in either cases of compressed or non-compressed data.

12 Claims, 5 Drawing Sheets

ELECTRONIC CAMERA APPARATUS HAVING IMAGE REPRODUCING FUNCTION AND METHOD FOR CONTROLLING REPRODUCTION THEREOF

CROSS-REFERENCE TO RELATED APPLICATION

This application is based upon and claims the benefit of priority from the prior Japanese Patent Application No. 11-066846, filed Mar. 12, 1999, the entire contents of which are incorporated herein by reference.

BACKGROUND OF THE INVENTION

The present invention relates to an electronic camera apparatus and a method for controlling reproduction of image, and more particularly to an electronic camera apparatus provided with an image buffer memory (work memory) having a capacity which can store a plurality of images and a method for the reproduction thereof.

Electronic still camera which stores image information of an object picked-up by the use of an image sensor such as CCD (Charge Coupled Device) in a recording device such as semiconductor memory exhibits particular advantages which are not involved in conventional silver-salt camera from such viewpoints that no developing procedure is required, that image information which has been taken into a personal computer or the like can be freely edited and processed, and that such image information can be transmitted to a remote place through a network.

In electronic still camera, it is generally carried out that image information is compressed to be stored in a recording device, while the image information is read out from the recording device to expand the same to restore the original image information in case of reproducing an image or outputting it to a personal computer and the like. Such compression recording is measures for utilizing efficiently capacity of a storage device to record images as much as possible.

In case of the above-mentioned compression processing or expansion processing, however, a certain degree of overhead time is required, even if such processing is carried out in a specially designed circuit under hardware circumstances. Accordingly, for example, when it is intended to display an image which is stored in a recording device on a monitor screen, there is such a problem in that the image cannot be reproduced after elapse of at least the above described overhead time (more precisely, a period of time required for reading the image from the storage device plus the above described overhead time) after completing a reproducing operation of image by pushing a prescribed key switch, so that instantaneous reproduction of image cannot be realized.

Furthermore, since electronic still camera uses generally a storage device such as flash memory having a comparatively slow readout speed or another storage device such as memory card being detachable with respect to its camera main body in view of cost, there is such a problem in that a period of time require for reading an image from storage device is not ignored, so that instantaneous reproduction of image cannot be achieved also in this case.

BRIEF SUMMARY OF THE INVENTION

Accordingly, it is an object of the present invention to provide an electronic camera apparatus by which instantaneous reproduction of image can be improved and a method for controlling the reproduction thereof.

In order to achieve the above described object, according to one aspect of the present invention, an electronic camera apparatus comprises image pick-up means (an image pick-up device) for picking up an object to output image data;

first image storage means (an image memory) for storing the image data output from the image pick-up means;

second image storage means (a buffer memory) for storing the image data read out from the first image storage means;

means (a display device) for displaying the image data read out from the second image storage means;

means for specifying image data to be displayed by the displaying means;

means for determining whether or not the image data specified by the specifying means is stored in the second image storage means;

first display control means for reading out the image data specified by the specifying means from the first image storage means to store the same in the second image storage means, and then, reading out the image data from the second image storage means to display the same by the display means when it is determined by the determining means that the image data is not stored in the second image storage means; and second display control means for reading out the image data specified by the specifying means from the second image storage means to display the same on the display means when it is determined by the determining means that the image data is stored in the second image storage means.

According to another aspect of the present invention, an electronic camera apparatus comprises image pick-up means (an image pick-up device) for picking up an object to output image data;

first image storage means (a buffer memory) for storing the image data output from the image pick-up means;

second image storage means (an image memory) for storing the image data read out from the first image storage means;

means (a display device) for displaying the image data read out from the second image storage means;

means for specifying image data to be displayed by the displaying means;

means for determining whether or not the image data specified by the specifying means is stored in the first image storage means;

first display control means for reading out the image data specified by the specifying means from the second image storage means to display the same by the displaying means when it is determined by the determining means that the image data is not stored in the first image storage means; and second display control means for reading out the image data specified by the specifying means from the first image storage means to display the same by the displaying means when it is determined by the determining means that the image data is stored in the first image storage means.

According to a still further aspect of the present invention, a method for controlling reproduction of image in an electronic camera apparatus in which image data obtained by picking up an object is stored in an image memory, and image data stored in the image memory is displayed on a display device, comprises specifying the image data to be displayed on the display device;

determining whether or not the specified image data exists in a work memory; and reading out the specified image data from the work memory to display the same on the display device when it is determined that the specified image data exists in the work memory.

According to the electronic camera and the reproduction controlling method of the present invention, it becomes possible to achieve improvements in instantaneous reproduction of image.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of The electronic camera apparatus according to the present invention will now be described with reference to the accompanying drawings.

First Embodiment

Figure 1:
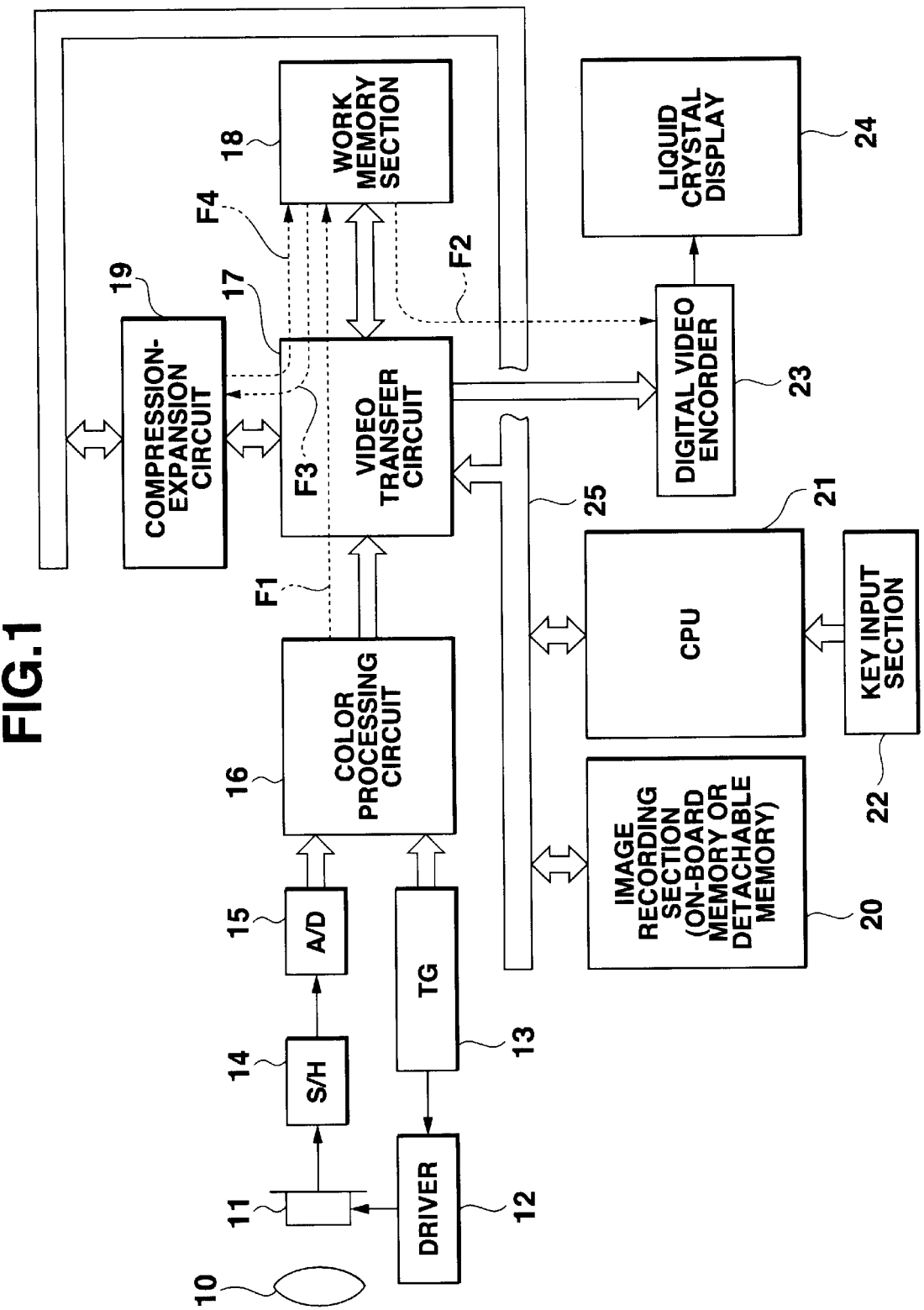
FIG. 1 is a block diagram showing an electronic still camera as a first embodiment of the electronic camera apparatus according to the present invention.

FIG. 1 is a block diagram in which an electronic camera according to the present invention is applied to electronic still camera wherein a CCD 11 is disposed in the rear of an objective 10, and a driver 12 is connected to the CCD 11. A reference clock of the driver 12 is supplied from a timing generator 13 thereto. An output from the CCD 11 is supplied to a video transfer circuit 17 through a sample/hold circuit 14, an analog-to-digital converter 15, and a color processing circuit 16. An output from the timing generator 13 is also supplied to the color processing circuit 16. A work memory section (or buffer memory) 18, and a compression-expansion circuit (corresponding to compressing means and expanding means) 19 are also connected with the video transfer circuit 17. The video transfer circuit 17, and the compression-expansion circuit 19 are connected in addition to an image recording section 20 with a bus line 25 of a CPU (Central Processing Unit) 21. To the CPU 21 is connected a key input section 22. An output of the video transfer circuit 17 is supplied to a liquid crystal display 24 through a digital video encoder 23. Image pick-up means is composed of the objective 10, the CCD 11, the driver 12, the timing generator 13, the sample/hold circuit 14, the analog-to-digital converter 15, and the color processing circuit 16, while display means is composed of the digital video encoder 23, and the liquid crystal display 24.

Functions of these respective sections are generally as follows.

Objective 10:

The objective 10 is used for focusing the image of an object on a light-receiving surface of the CCD 11, and the objective 10 is provided with a focusing mechanism for automatic focus function. The objective 10 may be provided with a zoom mechanism, or may be a retractable type.

CCD 11:

The CCD 11 is a solid-state image pick-up device for outputting electric charges generated by photoelectric conversion while transferring the same. Although there is a type of CCD which is used for analog delay line and the like, the CCD described herein means specifically a solid-state image sensor which converts two-dimensional optical information into time series (serial) electric signal to output the same.

The CCD 11 is generally composed of a photoelectric conversion section wherein a number of photoelectric transducers are arranged in an array, an electric charge accumulation section which accumulates output charge of the photoelectric transducers; and an electric charge readout section which reads out electric charge contained in the electric charge accumulation section in accordance with a predetermined manner, so that each photoelectric transducers correspond to pixels. Namely, there is, for example, at least one million divisions of arrays in a CCD having an effective pixel number of one million. For explanation's sake, the CCD 11 shown in FIG. 1 is the one having N×M array structure constituted by N rows (transverse direction) and M columns (vertical direction).

The CCD 11 in the present embodiment is a color CCD. In this connection, since pixel information itself of CCD has not generally color information, a color filter array (an elementary color filter in which three primary colors of light are utilized, or a complementary color filter in which three primary colors of color are utilized) is mounted in the front of the CCD, and further an optical low pass filter for removing false color signals having frequency components corresponding to pitches of the color filter array is mounted in the front thereof. However, such color filter array and optical low pass filter are omitted in FIG. 1.

Moreover, CCD may be classified into two types in accordance with manner configured to read-out electric charge. The first is a type of "alternate scanning lines readout manner" which skips a row of pixels one by one in case of reading out signals (which is also called "interlace CCD"), and the second is a type of "all scanning lines readout manner" which reads out sequentially whole scanning lines (which is also called "non-interlace CCD" or "progressive CCD". While a popular class electronic still camera utilizes the second type manner, there is a case where the first type manner is adopted in a mega-pixel class electronic still camera of these days having more than one million pixels.

For the convenience of explanation, the CCD 11 in the present embodiment is the one in accordance with the second type (non-interlace readout) manner.

Driver 12 and Timing Generator 13:

They are sections for generating driving signals required for reading out the CCD 11. The CCD 11 synchronizes with the driving signals to output an image signal. Since the CCD 11 in the present embodiment is assumed to utilize non-interlace read-out manner, the driver 12 and the timing generator 13 generate the driving signals which can transfer (read out) information of pixels in column unit while appointing successively respective rows of the CCD 11, in other words, they produce horizontal and vertical driving signals for reading out serially pixel information in a direction from the upper left position to the lower right position (this direction is similar to scanning direction of television) of the N column×M row array structure.

Sample/Hold Circuit 14:

The sample/hold circuit 14 samples (for example, correlation-double samples) time sequential signals (analog signals in this stage) read out from the CCD 11 in a frequency being suitable for resolution of the CCD 11. After the sampling, automatic gain regulation may be applied.

Analog-to-digital Converter 15:

The analog-to-digital converter 15 converts the sampled signals into digital signals.

Color Processing Circuit 16:

The color processing circuit 16 generates luminance-chrominance multiplex signal (hereinafter referred to as "YUV signal") by output from the analog-to-digital converter 15. The reason for producing YUV signal is as follows. An output from the analog-to-digital converter 15 corresponds substantially one-to-one with respect to an output from the CCD 11 except for differences in analog or digital type, and for error factors in sampling and digital conversion procedure, and thus, it is three primary color data (RGB data) itself. Such data has a large size, so that it is inconvenient in view of utilization of limited memory resources and processing time. In this respect, it is necessary for reducing amount of data at all by means of any manner. YUV signal may be considered to be a kind of signal for reducing amount of data on the basis of such a principle that respective elemental data (R-data, G-data, and B-data) of RGB data can be expressed by three color difference signals of G-Y, R-Y, and B-Y with respect to luminance signal Y, and in addition, if redundancy of these three color difference signals is removed, no transfer of G-Y is required, so that it can be reproduced by $G-Y=\alpha(R-Y)-\beta(B-Y)$ wherein $\alpha$ and $\beta$ are composite coefficients.

While there is a case where YUV signal is called YCbCr signal (Cb and Cr mean B-Y and R-Y, respectively), it is referred to as "YUV signal" herein.

Video Transfer Circuit 17:

The video transfer circuit 17 controls a flow of data flowing through the color processing circuit 16 (constituting an output section of the image pick-up means), the work memory section 18, the digital video encoder 23 (constituting an input section of the display means), and the compression-expansion circuit 19 (constituting a major portion of compressing means and expanding (decompressing) means). More specifically, a first flow F1 and a second flow F2 are admitted to pass through the above described components in a preparing stage for taking a picture wherein a picture composition is adjusted while observing a display appeared on the liquid crystal display 24. A third flow F3 is admitted to pass through these components in a recording stage wherein a shutter key (not shown) mounted on the key input section 22 is pushed to capture the image in the course of display in the image recording section 20. The second flow F2 and a fourth flow F4 are admitted to pass through these components in a reproducing stage wherein a desired image is read out from the image recording section 20 to display the image thus read out on the liquid crystal display 24.

In the above description, the term "flow" means an expression for conceptionally indicating a movement of the data flowing through the color processing circuit 16, the work memory section 18, the digital video encoder 23, and the compression-expansion circuit 19 for the convenience sake, so that there is no particular meaning in the term itself. In a digital system, however, a prompt movement of data affects directly on performance of the system in general, and particularly, in an electronic still camera which must process especially a wealth of image information, it (a prompt movement of data) is one of design condition which should be naturally taken into consideration. Accordingly, it is preferred that a part or the whole of the above described flow of data is the one to which has been applied a manner of high-speed data transfer. More specifically, in a preferred embodiment of the present invention, the first through the fourth flows F1 to F4 are the ones in accordance with, for example, DMA (Direct Memory Access) transfer, and the video transfer circuit 17 includes a control section required therefor (DMA controller) and other peripheral devices (for example, an FIFO memory for adjusting a transfer speed, an interface circuit and the like), so that "prompt data transfer" (DMA transfer) through the color processing circuit 16, the work memory section 18, the digital video encoder 23, and the compression-expansion circuit 19 is adjusted by means of functions in the above described respective components.

Work Memory Section 18:

The work memory section 18 is composed of a DRAM (Dynamic Random Access Memory) being a kind of rewritable semiconductor memory. The work memory 18 is used for a buffer area of data being an object of compression processing and expansion processing executed in the compression-expansion circuit 19 as well as for a buffer area for processed result in addition to use of a buffer area for through images. Furthermore, in such an electronic still camera which can record a plurality of continuously picked-up images by utilizing periodical image signals output from the CCD 11, the work memory section 18 is used also for a buffer area for holding tentatively a plurality of such images picked-up continuously.

In general, DRAM differs from static RAM (SRAM) in that rewriting (refreshing) of data is dynamically carried out for maintaining contents to be stored. However, although DRAM is inferior to SRAM in a writing and reading speed, cost per bit is inexpensive, and a temporary storage area of a large capacity can be constituted inexpensive, so that DRAM is particularly suitable for electronic still camera. In this respect, however, it is to be noted that the work memory section 18 in the present invention is not limited to DRAM, but a memory having a comparatively fast writing and reading speed is applicable, and a flash memory exhibiting speedy technical innovation in late years may be used.

Figure 2:
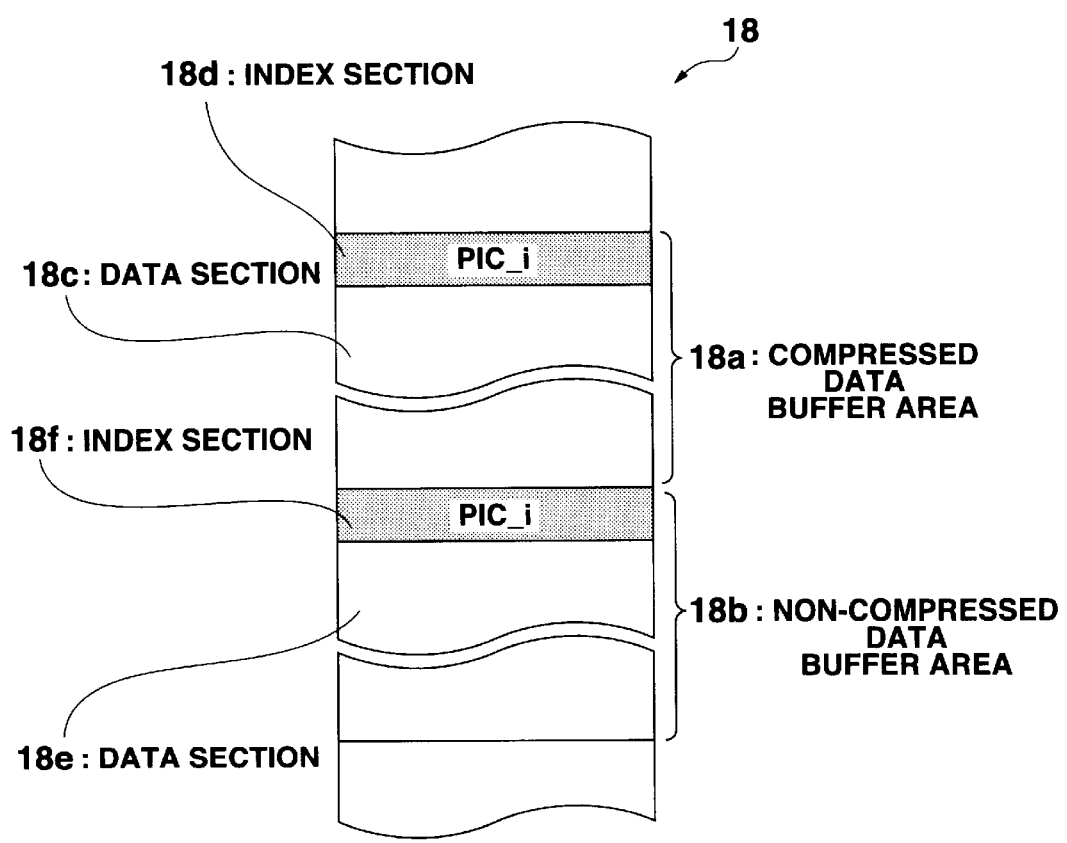
FIG. 2 is a schematic diagram showing a memory map of an essential part of a work memory section.

FIG. 2 is a diagram illustrating an essential part of a memory map of the work memory section 18 wherein a buffer area 18*a* (hereinafter referred to as "compressed data buffer area") for objective data for expansion procedure to be executed by the compression-expansion circuit 19 or resulting data of compression processing executed by the compression-expansion circuit 19 (image information which has been compressed; hereinafter referred to as "compressed data"), and a buffer area 18b (hereinafter referred to as non-compressed data buffer area) for resulting data of expansion processing executed by the compression-expansion circuit 19 or objective data for compression procedure to be executed by the compression-expansion circuit 19 (image information which has not yet been compressed; hereinafter referred to as "non-compressed data") are schematically illustrated.

The compressed data buffer area 18a is provided with a data section 18c for storing compressed data which has been read out arbitrarily from the image recording section 20 or compressed data which is written into the image recording section 20 from now on and an index section 18d for storing identification information of the compressed data, while the non-compressed data buffer area 18b is similarly provided with a data section 18e for storing expanded data (non-compressed data) which is arbitrarily read out from the image recording section 20 and expanded by the compression-expansion circuit 19 or image data (non-compressed data) which is generated in the pick-up section, and an index section 18f for storing identification information of the non-compressed data.

The term "identification information" means unique information assigned by its system when compressed data is recorded in the image recording section 20, for example, it is represented by serial picture numbers PIC_i (wherein it is an integer of 1, 2, 3, . . . , n) containing "1" as the initial value. While there is a case where a file number is employed as its identification information when compressed data is a movie file containing a plurality of continuously picked-up image (for example, a movie file of AVI format), a picture number is to be used in the present embodiment for simplicity of explanation.

Compression-Expansion Circuit 19:

Compression processing and expansion processing are implemented in the compression-expansion circuit 19. A part of the work memory section 18 is used for a working area at the time of executing processing as mentioned above. More specifically, the compression data buffer area 18a and the non-compressed data buffer area 18b of the work memory section 18 are used in the case where compression procedure or expression procedure is carried out.

The term "compression" means to remove redundancy of information by the use of a predetermined coded algorithm thereby to reduce size of the information, while the term "expansion" means to reproduce the reduced size of information to the original size thereof by means of reverse processing with respect to the former processing. Compression may be called encoding, while there is a case where expansion is called decoding, restoration, or decompression.

Algorithm of compression/expansion includes the reversible one wherein original information can be completely reproduced at the time of expansion thereof and the nonreversible one wherein original information is incompletely reproduced. Standard coding algorithm of color static image is JPEG (Joint Photographic Experts Group) principle belonging to the latter category, and the coding algorithm utilized in most of electronic still cameras is JPEG principle or JPEG compatible principle.

Image Recording Section 20:

The image recording section 20 directs the one wherein all the bits (or a block unit) of contents can be erased electrically, and contents can be rewritten among rewritable read only memory (PROM: Programmable Read Only Memory). It may be called flash EEPROM (Flash Electrically Erasable PROM). The image recording section 20 in the present invention may be in the form of a fixed type in which the image recording section cannot be removed from its camera main body, or in the form of a card type or a package type in which the image recording section is removable.

Furthermore, the image recording section 20 is required to be initialized (formatted) in accordance with a predetermined principle irrespective of types thereof which may be built-in or removable type. In formatted image recording section 20, a certain number of images (compressed data) can be recorded in response to its memory size. For instance, when it is assumed that a data size after compression is 100 KB, forty images can be recorded in a memory recording section having 4 MB memory size, and eighty images can be recorded in a memory recording section having 8 MB memory size.

Figure 3:
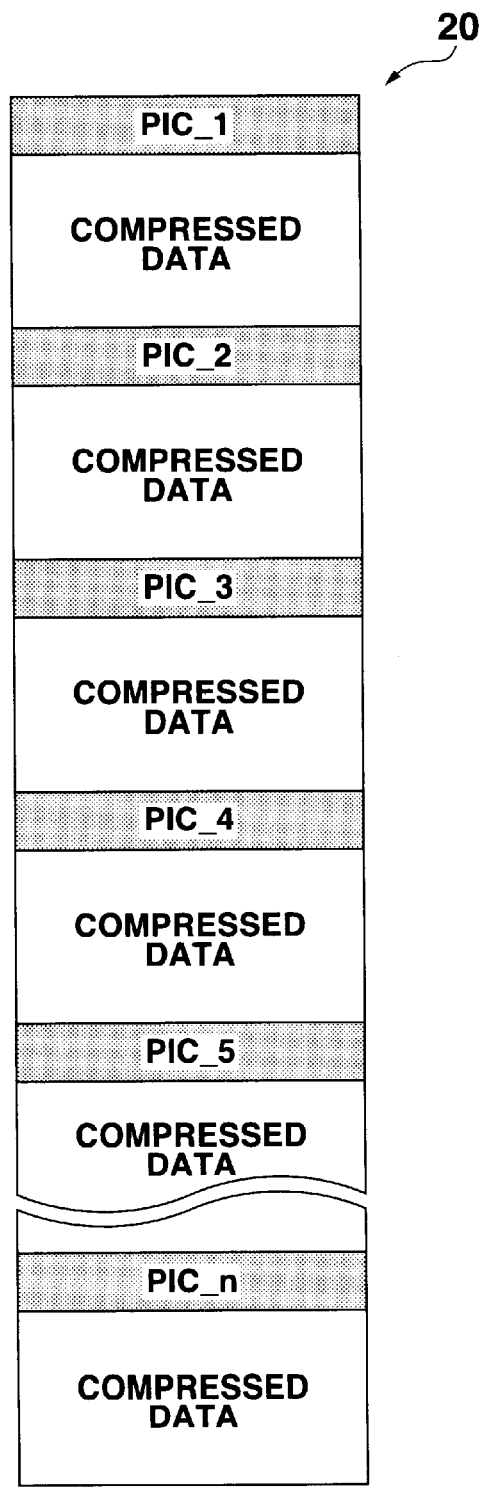
FIG. 3 is a conceptual diagram showing a constitution of an image recording section.

FIG. 3 is a conceptual diagram showing a constitution of the image recording section 20 wherein n-pieces of compression data are stored, and unique picture numbers from PIC_1 to PIC_n are assigned to each of the compressed data. When compressed data is a movie file containing a plurality of continuously picked-up images, the file number which has been assigned to the compressed data is considered to be a picture number.

CPU 21:

The CPU 21 executes a predetermined program to centrally control actions of a camera. The program has been written in a ROM (not shown) mounted inside the CPU 21, and under the circumstances, a program for a recording mode is selected to be loaded into a RAM (not shown) mounted inside the CPU 21 from the ROM to execute the program in case of the recording mode, while a program for a reproducing mode is selected to be loaded into the RAM (not shown) mounted inside the CPU 21 from the ROM to execute the program in case of the reproducing mode. It is to be noted that these ROM and RAM are not necessarily mounted inside the CPU 21, but they may be mounted externally, and further the ROM may be the one which can rewrite data (program).

Key Input Section 22:

The key input section 22 generates operating signals of a variety of key switches mounted on its camera main body. One of the key switches is the shutter key as mentioned above, and the others are, for example, a plus key, a minus key, a power switch key, a menu key, a display key, a recording mode key, a self-timer key, a strobe mode key, a REC/PLAY key and the like, and functions of these respective keys are as follows.

Shutter Key:

The shutter key is a key functioning as "shutter key" as is named (which acts to fix exposed and focused conditions by pushing half the key stroke, while it acts to capture an image by pushing the whole key stroke) in case of a recording mode. The shutter key is a multiple function key acting also as an YES key for answering in the affirmative of any item selected from a variety of items displayed on the liquid crystal display 24 at the time when a menu key is pushed in case of a recording mode or a reproducing mode (which is the one wherein a captured image is reproduced or output to other equipment).

Plus Key:

The plus key is the one used for selecting an image to be reproduced or selecting settings of a variety of systems. The term "plus" means a direction for selecting something wherein it indicates a direction towards the newest image in case of selecting images, and it indicates a scanning direction in the liquid crystal display 24 in case of selecting a setting of systems.

Minus Key:

The minus key has the same functions as those of the plus key except that it indicates the direction being the reverse of the plus key.

Power Source Switch:

The power source switch is the one for turning ON and OFF the power source of a camera.

Menu Key:

The menu key is the one for effecting to set a variety of systems. In a reproducing mode, the menu key displays a variety of items including a deleting mode (a mode for erasing images) and a displaying mode for moving images on the liquid crystal display 24, while the menu key displays on the liquid crystal display 24 items to be selected which are required for recording an image, for example, definition of an image to be recorded, ON or OFF in an auto focus system, a period of time for taking continuously photographs, and the like in a recording mode.

Display Key:

The display key is a key configured to display various information such as the available number in a remaining capacity for taking pictures or a pick-up manner (normal pick-up, panoramic pick-up, continuous pick-up) and the like on an image which has been displayed on the liquid crystal display 24 in an overlapped manner in a recording mode, while property information (page number, definition and the like) of an image reproduced is displayed on the liquid crystal display 24 in an overlapped manner in a reproducing mode.

Recording Mode Key:

The recording mode key is the one for selecting availability of only a recording mode, and it selects normal pick-up, panoramic pick-up, continuous pick-up and the like fashion.

Self-timer Key:

It is a key for turning ON and OFF self-timer function.

Strobe Mode Key:

The strobe mode key is the one for effecting a variety of settings in a strobe such as a setting for forced luminescence, inhibition of luminescence, and prevention of red-eye.

REC/PLAY key:

The REC/PLAY key is a key for switching a recording mode and a reproducing mode wherein the key is positioned at "REC" in case of pick-up procedure, while the key is positioned at "PLAY" in case of reproducing procedure. In these circumstances, when the key is switched from a position of "REC" to that of "PLAY", the latest image picked-up can be reproduced and displayed on the liquid crystal display 24.

Digital Video Encoder 23:

The digital video encoder 23 converts images to be displayed which have been read out from an image buffer of the work memory section 18 through the video transfer circuit 17 into analog voltages, and they are successively output in accordance with a timing in response to a scanning manner of the liquid crystal display 24.

Liquid Crystal Display 24:

It is a small-sized flat surface display mounted on a main body of its electronic still camera, and the display is generally a liquid crystal type flat surface display, but it is not limited to the display specified as above.

The liquid crystal display 24 displays a through image to serve adjustment for picture composition and the like when the REC/PLAY key is at a position "REC", while the liquid crystal display 24 displays an image to be reproduced which is taken lastly (or an image which is arbitrarily selected by an operator by the use of the plus key or the minus key), whereby the image which has been picked-up can be observed when the REC/PLAY key is at a "PLAY" position. Moreover, the liquid crystal display 24 displays information as to pick-up modes thereon in an overlapped manner or predetermined menu items when the menu key or the display key is pushed by the operator.

Bus 25:

The bus 25 is a path for transferring data (and addresses) being in common among the above described sections. Although required control lines have been omitted in FIG. 1, they are disposed also among the respective sections in reality.

In the following, operations of the present invention will be described, and an outline as to recording and reproduction of image will be described first.

In a recording mode, the CCD 11 placed behind the objective 10 is first driven by the drive signal from the driver 12, and the image focused on the CCD 11 by means of the objective 10 is converted photoelectrically in every given cycles, whereby image signals of one picture image are periodically output. Then, these image signals are sampled in the sample/hold circuit 14, and the signals are converted into digital signals by the analog-to-digital converter 15, and then, YUV signals (non-compressed data) are produced by the color processing circuit 16. The YUV signals are transferred to the non-compressed data buffer area 18b (see FIG. 2) of the work memory section 18 through the video transfer circuit 17. These YUV signals are read out by the video transfer circuit 17 after completing transfer thereof to the buffer area, and delivered to the liquid crystal display 24 through the digital video encoder 23, whereby the signals are displayed as a through picture image.

In this condition, when an angle of the camera which is now handled is changed by an operator, a picture composition of the through image displayed on the liquid crystal display 24 at present changes, then the shutter key is pushed halfway by the operator at his (or her) suitably decided timing (at the time when a desired picture composition is attained), thereafter, the shutter key is pushed down completely by the operator, so that the YUV signals which have been stored in the non-compressed buffer area 18b of the work memory section 18 are fixed as they are at that instant, and further the through image which has been displayed on the liquid crystal display 24 is also fixed as it is at the same instant.

Then, the YUV signals which have been stored in the non-compressed data buffer area 18b of the work memory section 18 are JPEG-encoded (compressed) with a unit called basic block of 8×8 pixels in every respective components of Y, Cb, and Cr by means of the compression-expansion circuit 19, and then the data thus compressed is written into the image recording section 20 through the compressed data buffer area 18a (see FIG. 2) of the work memory section 18.

In a reproducing mode, on the other hand, a path extending from the CCD 11 to the work memory section 18 is closed, at the same time, the image captured lastly is read out from the image recording section 20 into the data buffer area 18a of the work memory section 18, and the image thus read out is subjected to expansion processing by means of the compression-expansion circuit 19. After the expanded data is stored in the non-compressed data buffer area 18b of the work memory section 18, the resulting data is delivered to the liquid crystal display 24 from the non-compressed data buffer region 18b through the digital video encoder 23, whereby the data is displayed as a reproduced image.

Figure 4:
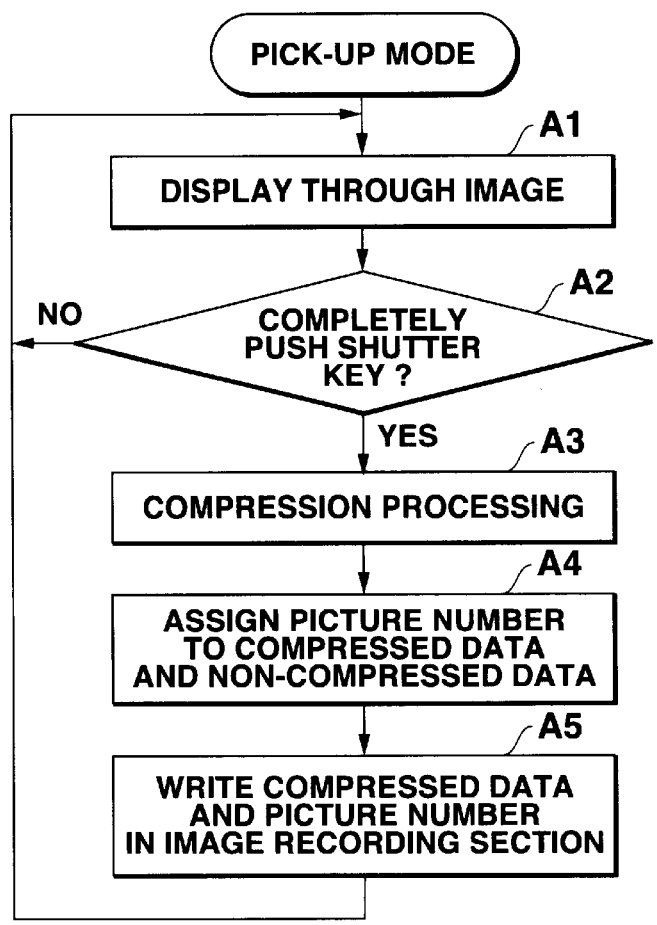
FIG. 4 is a flowchart illustrating an essential part of an image recording mode program.

FIG. 4 is a flowchart illustrating an essential part of a pick-up mode program in the present embodiment.

The program is executed either at the time when the REC/PLAY key is switched from the position "PLAY" to the position "REC", or at the time when a menu indication is ceased at the position "REC" wherein the following procedures are effected in the order of steps.

First, the image data (YUV signals) produced in the pick-up section and stored successively into the data section 18e in the non-compressed data buffer area 18b of the work memory section 18 is displayed on the liquid crystal display 24 as a through image (viewfinder image)(step A1).

In step A2, a pushed condition in the shutter key of the key input section 22 is determined, and display of a through image is continued until it is determined that the shutter key is completely pushed down by an operator.

When it is determined that the shutter key is completely pushed down in step A2, the procedure proceeds to step A3, the YUV signals which have been written in the data section 18e at that time are compressed by the use of the compression-expansion circuit 19, and the compressed data obtained as a result of processing the YUV signals is written into the data section 18c in the compressed data buffer area 18a of the work memory section 18.

Thereafter, the procedure transfers to step A4 wherein the same picture number (index data) is assigned to non-compressed data which has been written in the data section 18e as well as to the compressed data obtained as a result of compressing the non-compressed data and which has been written in the data section 18c.

In other words, a picture number is written into the index section 18d in the compressed data buffer area 18a, and at the same time, the same picture number is written into the index section 18f in the non-compressed data buffer area 18b.

Then, the compressed data which has been written in the data section 18c as well as the picture number which has been written in the index section 18d are read out to store the same in the image recording section 20, and the procedure returns to step A1, thereafter, processing in steps A3 to A5 is repeated in every occasions when the shutter key is completely pushed down by an operator in step A2.

It is to be noted that a manner for assigning a picture number (index data) to image data is not limited to the above-mentioned manner, but any other suitable manners are applicable.

Figure 5A:
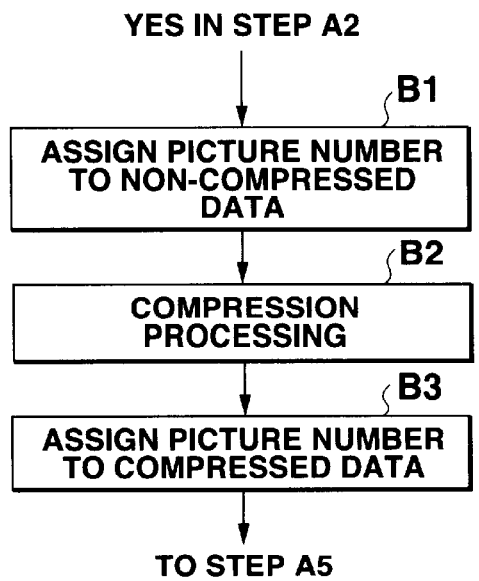
FIGS. 5A and 5B are flowcharts illustrating modifications of the image recording mode program.

For instance, as shown in FIG. 5A, the manner may be arranged in such that when it is determined that a shutter key is completely pushed down by an operator in step A2, in other words, when it is determined that non-compressed data is fixed, a picture number is first assigned to the non-compressed data (step B1), and then, the same picture number is assigned to compressed data in step B3 after completing processing for compressing the above described non-compressed data in step B2.

Figure 5B:
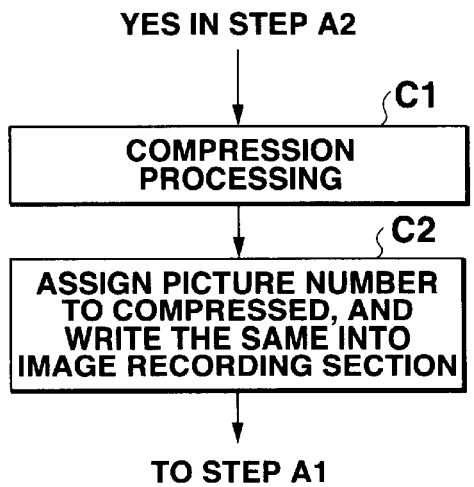

Furthermore, it may be arranged as shown in FIG. 5B in such that no processing in step A4 is carried out (in other words, no picture number is written in the index sections 18d and 18f of the work memory section 18), a picture number is assigned to only compressed data to be stored in the image recording section 20 in step C2 after compression processing in step C1 is completed.

Figure 6:
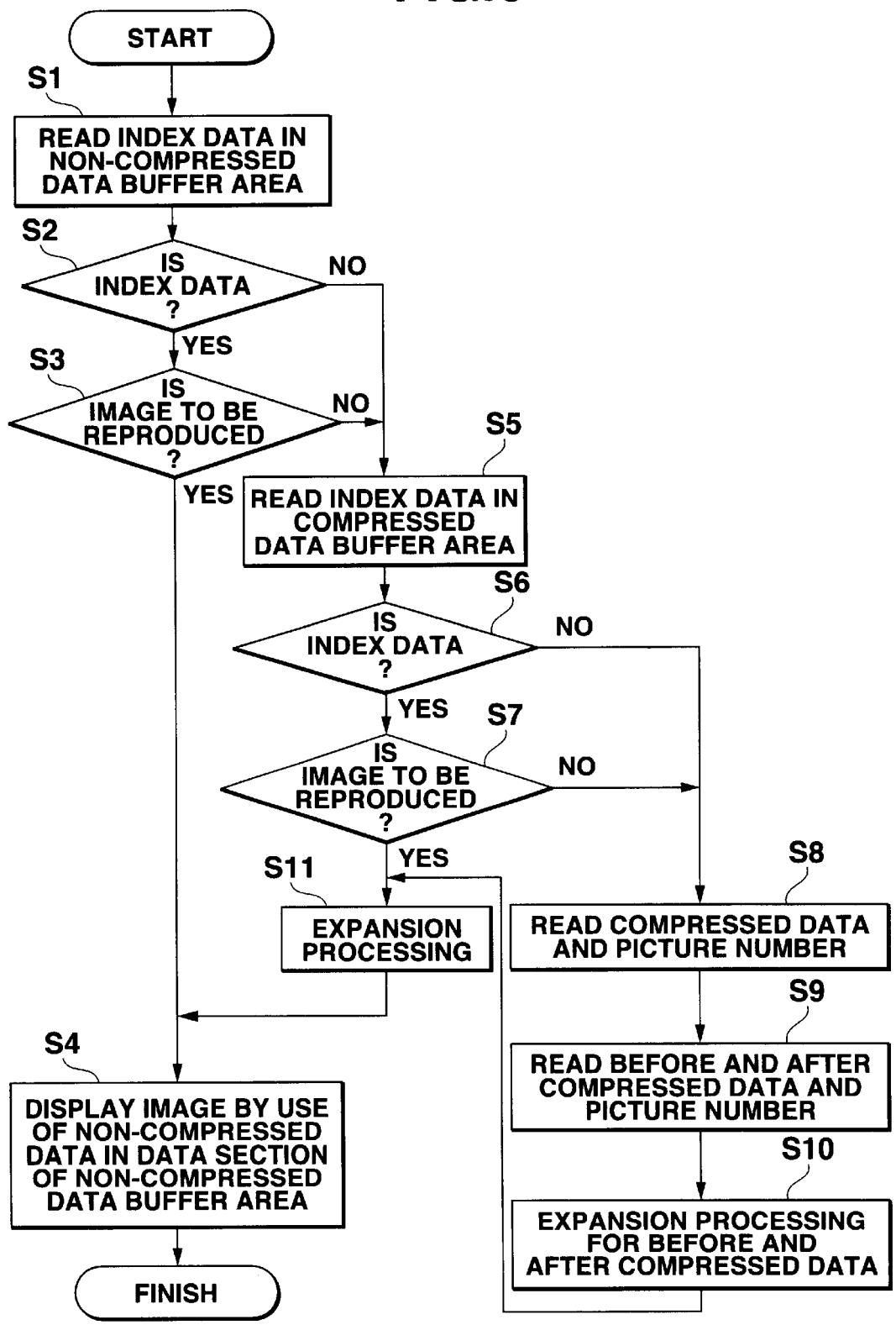
FIG. 6 is a flowchart illustrating an essential part of an image reproducing mode program.

FIG. 6 is a flowchart illustrating an essential part of a reproducing mode program in the present embodiment.

The program is executed either at the time when the REC/PLAY key is switched from the position "REC" to the position "PLAY", or at the time when a menu indication is ceased at the position "PLAY" wherein the following procedures are effected in the order of steps.

It should be noted that the following procedures are not only executed in the case where a reproducing mode is established, but also in every occasions where a picture number of an image to be reproduced is input by an operator and where a scrolling key (plus key or minus key) is operated by the operator, and where images specified for reproduction are switched in accordance with automatic scroll of pages.

First, a procedure refers to the non-compressed data buffer area 18b in the work memory section 18, and reads the data contained in the index section 18f (step S1). In step S2, it is determined whether or not there is an effective index data (picture data PIC__i) in the index section 18f of the non-compressed data buffer area 18b, and if it is (decision YES in step S2), then, it is determined in step S3 whether or not the index data coincides with the picture number of an image to be reproduced by comparing them with each other. If it is in coincidence, an image is displayed on the liquid crystal display 24 by utilizing the non-compressed data stored in the data section 18e in the non-compressed data buffer area 18b in step S4.

Accordingly, in the above described case, since an image is displayed by utilizing the non-compressed data "which has been left" in the data section 18e of the non-compressed data buffer area 18b, a procedure for reading the compressed data from the image recording section 20 and a procedure for expanding the compressed data can be omitted, so that it becomes possible to increase remarkably a speed required for displaying an image by at least a period of time necessary for performing these two procedures, whereby instantaneous reproduction of image can be improved.

On the other hand, either when there is no effective index data in the index section 18f of the non-compressed data buffer area 18b (NO in step S2), or when the index data does not coincide with that of an image to be displayed (NO in step S3), the compressed data buffer area 18a in the work memory section 18 is referred to, and the data contained in the index section 18d is read in step S5. Then, it is determined in step S6 whether or not there is an effective index data (PIC__i) in the index section 18d of the compressed data buffer area 18a read, and if it is (YES decision in step S6), the index data is compared with a picture number of the image to be reproduced to determine whether or not they coincide with each other in step S7. When they coincide with each other, a picture number of the compressed data stored in the data section 18c of the compressed data buffer area 18a (namely, an index data stored in the index section 18d of the compressed data buffer area 18a) is transcribed in the index section 18f in the non-compressed data buffer area 18b, and at the same time, the compressed data is expanded to store the result of expansion into the data section 18e of the non-compressed data buffer area 18b. Thereafter, an image is displayed on the liquid crystal display 24 by using the expanded data which is stored in the data section 18e of the non-compressed data buffer area 18b in step S4.

In either the case when effective index data (PIC__i) does not exist in the index section 18d in the compressed data buffer area 18a (NO decision in step S6), or the case when such index data does not coincide with a picture number of the image to be reproduced even though the effective index data exists (NO decision in step S7), compressed data of the image to be reproduced and a picture number are read from the image recording section 20 in step S8, and they are stored in the data section 18c of the compressed data buffer area 18a, at the same time, the picture number of the image to be reproduced is stored in the index section 18d of the same buffer area 18a.

Then, the compressed data preceding and succeeding to the image to be reproduced and their picture numbers are similarly read from the image recording section 20 to store the data in the data section 18c of the compressed data buffer area 18a, and at the same time, these picture numbers of images preceding and succeeding to the image to be reproduced are stored in the index section 18d of the same buffer area 18a in step S9. This is because that these adjacent pictures are likely to be succeedingly accessed.

Thereafter, picture numbers of the compressed data preceding and succeeding to the image to be reproduced which are stored in the data section 18c of the compressed data buffer area 18a are transcribed into the index section 18f of the non-compressed data buffer area 18b, and further, the compressed data are expanded and the results of expansion are stored in the data section 18e of the non-compressed data buffer area 18b in step S10.

Then, compressed data of an image to be reproduced which is stored in the data section 18c of the compressed data buffer area 18a is expanded in step S11, and the expanded data is stored in the data section 18e of the non-compressed data buffer area 18b, in addition, a picture number of the image to be reproduced is written in the index section 18f of the same buffer area 18b. Finally, an image is displayed on the liquid crystal display 24 by utilizing the expanded data which is stored in the data section 18e of the non-compressed data buffer area 18b in step S4.

As mentioned above, since an image is displayed by utilizing the compressed data "which has been left" in the data section 18c of the compressed data buffer area 18a when an effective index data (PIC__i) exits in the index section 18d of the compressed data buffer area 18a, and further the index data coincides with a picture number of the image to be reproduced, a procedure for reading the compressed data from the image recording section 20 can be omitted, so that it becomes possible to remarkably increase a speed required for displaying an image by at least a period of time necessary for performing the reading procedure, whereby instantaneous reproduction of image can be improved.

As described above, in the present preferred embodiment, image data which has been specified to be reproduced is displayed by utilizing such image data which has been left in the work memory 18, not but reading from the image data from the image recording section 20 in the case where the image data which has been specified to be reproduced is left in the work memory 18 without erasing the same.

More specifically, since an image is displayed by using "compressed data" or "non-compressed data" which has been left in the work memory section 18, both procedures for reading data from the image recording section 20 and for expanding the data can be omitted in the case where non-compressed data is utilized, while a procedure for reading data from the image recording section 20 can be omitted even in the case where compressed data is utilized. Accordingly, such a particular advantage which has not yet been achieved by the prior art that it is possible to remarkably increase a speed required for displaying an image in both the above described cases, whereby instantaneous reproduction of image can be improved.

For convenience in the above description, although a procedure for reading the images preceding and succeeding to an image to be reproduced to expand the same (steps S9 and S10) has been performed between a procedure for reading the image to be reproduced and a procedure for expanding the same (steps S8 and S11), the former procedure may be executed either after completing a procedure configured to display the image to be reproduced (step S4), or a procedure for expanding the image to be reproduced and the images preceding and succeeding to the same may be performed after completing a procedure for reading the image to be reproduced and the images preceding and succeeding to the same.

Moreover, a procedure for reading images preceding and succeeding to an image to be reproduced to expand them (steps S9 and S10) may be omitted.

Further, although the preferred embodiment of the present invention has been described in the case where an electronic still camera is applied to such an electronic still camera wherein image data produced in a pick-up section is compressed to store the image thus compressed in an image recording section, the invention is also applicable to an electronic still camera wherein image data picked-up is stored in an image recording section without compressing such image data.

Furthermore, a pick-up section detachable to its camera main body may also be used, or an external monitor may be used for a display section.

In the above description, while "non-compressed data" which has been left in the work memory section 18 has been simply expressed by the term data "after completing an expanding procedure" or data "produced by a pick-up section", this means, for example, that data reproduced in accordance with JPEG principle or data produced in the color processing circuit 16 are included, as a matter of course, and it means further that intermediate data in the course of restoration or encoding is included, besides, it means that such developed data is also included in the former data in an electronic still camera which adopts such an architecture that non-compressed data is reformed into a displaying form, and it is once developed in a work memory, thereafter an image is displayed.

While the present embodiment has been described in the case where an electronic camera of the present invention is applied to an electronic still camera, the present invention is also applicable to a moving video picture camera such as a video movie camera for recording and reproducing moving picture images, and an MPEG camera.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic camera apparatus comprising:
   image pick-up means for picking up an object to output image data;
   compression means for compressing the image data output from said image pick-up means;
   first image storage means for storing the image data compressed by said compression means;
   expansion means for expanding compressed image data read out from said first image storage means;
   second image storage means for storing the image data expanded by said expansion means and the compressed image data read out from said first image storage means;
   means for displaying expanded image data read out from said second image storage means;
   means for specifying image data to be displayed by said displaying means;

first determination means for determining whether the image data specified by said specifying means is in the expanded image data stored in said second image storage means;

second determination means for determining whether the image data specified by said specifying means is in the compressed image data stored in said second image storage means when said first determination means determines that the image data specified by said specifying means is not in the expanded image data;

first display control means for reading out expanded image data specified by said specifying means from said second image storage means, and allowing said displaying means to display the expanded image data when said first determination means determines that the image data specified by said specifying means is in the expanded image data;

second display control means for reading out compressed image data specified by said specifying means from said second image storage means, controlling said expansion means to expand the compressed image data, storing the expanded image data in said second image storage means, reading out the expanded image data from said second image storage means, and allowing said displaying means to display the expanded image data when said second determination means determines that the image data specified by said specifying means is in the compressed image data stored in said second image data storage means; and third display control means for reading out compressed image data specified by said specifying means from said first image storage means, storing the compressed image data in said second image storage means, controlling said expansion means to expand the compressed image data, storing the expanded image data in said second image storage means, reading out the expanded image data from said second image storage means, and allowing said displaying means to display the expanded image data when said second determination means determines that the image data specified by said specifying means is not in the compressed image data stored in said second image storage means.

2. The electronic camera apparatus according to claim 1, wherein said second image storage means includes means for storing non-compressed image data output from said image pick-up means and not yet compressed by said compression means as expanded image data, and means for storing compressed image data compressed by said compression means and not yet stored by said first image storage means; and wherein said first image storage means stores image data read out from said second image storage means.

3. The electronic camera apparatus according to claim 1, wherein a readout speed of said first image storage means is slower than a readout speed of said second image storage means.

4. The electronic camera apparatus according to claim 1, wherein said first image storage means comprises a removable memory device.

5. The electronic camera apparatus according to claim 1, wherein said third display control means for reads out the compressed image data specified by said specifying means from said first image storage means together with compressed image data other than said specified compressed image data from said first image storage means to allow the compressed image data other than said specified compressed image data to be stored in said second image storage means when said second determination means determines that the image data specified by said specifying means is not in the compressed image data stored in said second storage means.

6. The electronic camera apparatus according to claim 1, further comprising ID storage means for storing identification information specifying the expanded image data and the compressed image data stored in said second image storage means, wherein said first determination means compares identification information for specifying the image data specified by said specifying means with the identification information stored in said ID storage means to determine whether the identification information for specifying the image data specified by said specification means coincides with the identification information stored in said ID storage means, and determines whether the image data specified by said specifying means is in the expanded image data stored in said second image storage means; and wherein said second determination means compares the identification information for specifying the image data specified by said specifying means with the identification information stored in said ID storage means to determine whether the identification information for specifying the image data specified by said specifying means coincides with the identification information stored in said ID storage means, and determines whether the image data specified by said specifying means is in the compressed image data stored in said second image storage means.

7. The electronic camera apparatus according to claim 6, wherein said first image storage means stores identification information for specifying the image data stored therein by associating the identification with the image data, and wherein said electronic camera apparatus further comprises writing means for reading out the identification information for specifying the image data specified by said specifying means from said first image storage means to store the identification information in said ID storage means when said second determination means determines that the image data is not in the compressed image data stored in said second image storage means.

8. An electronic camera apparatus comprising:

image pick-up means for picking up an object to output image data;

compression means for compressing the image data output from said image pick-up means;

first image storage means for storing non-compressed image data output from said image pick-up means and not yet compressed by said compression means and for storing the compressed image data compressed by said compression means;

second image storage means for storing compressed image data read out from said first image storage means;

expansion means for expanding compressed image data read out from said second image storage means;

means for displaying non-compressed image data expanded by said expansion means;

means for specifying image data to be displayed by said display means;

first determination means for determining whether the image data specified by said specifying means is in the non-compressed image data stored in said first image storage means;

second determination means for determining whether the image data specified by said specifying means is in the compressed image data stored in said first image storage means when it is determined by said first determination means that the image data specified by said specifying means is not in the non-compressed image data;

first display control means for reading out non-compressed image data specified by said specifying means from said first image storage means, and allowing said display means to display the non-compressed image data when it is determined by said first determination means that the image data specified by said specifying means is in the non-compressed image data;

second display control means for reading out compressed image data specified by said specifying means from said first image storage means, controlling said expansion means to expand the compressed image data, storing the expanded image data in said first image storage means as the non-compressed image data, reading out the non-compressed image data from said first image storage means, and allowing said display means to display the non-compressed image data when it is determined by the second determination means that the image data which is specified by said specifying means in the compressed image data in said first image storage means; and third display control means for reading out compressed image data specified by said specifying means from said second image storage means, storing the compressed image data in said first image storage means, controlling said expansion means to expand the compressed image data, storing the expanded image data in said first image storage means as the non-compressed image data, reading out the non-compressed image data from said first image storage means, and allowing said displaying means to display the non-compressed image data when it is determined by said second determination means that the image data specified by said specifying means is not in the compressed image data in said first storage means.

9. An electronic camera apparatus comprising:

an image pick-up device configured to pick up an object to output image data;

a compression unit configured to compress the image data output from said image pick-up device;

an image memory configured to store the image data compressed by said compression unit;

an expansion unit configured to expand compressed image data read out from said image memory;

a buffer memory configured to store image data expanded by the expansion means and the compressed image data read out from said image memory;

a display device configured to display expanded image data read out from said buffer memory;

a specification unit configured to specify image data to be displayed by said display device;

a first determination unit configured to determine whether the image data specified by said specification unit is in the expanded image data stored in said buffer memory;

a second determination unit configured to determine whether the image data specified by said specification unit is in the compressed image data stored in said buffer memory when it is determined by said first determination unit that the image data specified by said specifying means is not in the expanded image data;

a first display control unit configured to read out expanded image data specified by said specification unit from said buffer memory, and to allow said display device to display the expanded image data when it is determined by said first determination unit that the image data specified by said specification unit is in the expanded image data;

a second display control unit configured to read out compressed image data specified by said specification unit from said buffer memory, control said expansion unit to expand the compressed image data, store the expanded image data in said buffer memory, read out the expanded image data from said buffer memory, and allow said display device to display the expanded image data when it is determined by the second determination unit that the image data which is specified by said specification unit is in the compressed image data stored in said buffer memory; and a third display control unit configured to read out compressed image data specified by said specification unit from said image memory, store the compressed image data in said buffer memory, control said expansion unit to expand the compressed image data, store the expanded image data in said buffer memory, read out the expanded image data from said buffer memory, and allow said display device to display the expanded image data when it is determined by said second determination unit that the image data specified by said specification unit is not in the compressed image data in said buffer memory.

10. An electronic camera apparatus comprising:

an image pick up device configured to pick-up an object to output image data;

a compression unit configured to compress the image data output from said image pick-up device;

a buffer memory configured to store non-compressed image data output from said image pick-up device and not yet compressed by said compression unit and to store the compressed image data compressed by said compression unit;

an image memory configured to store compressed image data read out from said buffer memory;

an expansion unit configured to expand compressed image data read out from said image memory;

a display device configured to display non-compressed image data expanded by said expansion unit;

a specification unit configured to specify image data to be displayed by said display device;

a first determination unit configured to determine whether the image data specified by said specification section is in the non-compressed image data stored in said buffer memory;

a second determination unit configured to determine whether the image data specified by said specification unit is in the compressed image data stored in said buffer memory when it is determined by said first determination unit that the image data specified by said specifying means is not in the non-compressed image data;

a first display control unit configured to read out non-compressed image data specified by said specification unit from said buffer memory, and allow said display device to display the non-compressed image data when it is determined by said first determination unit that the image data specified by said specification unit is in the non-compressed image data;

a second display control unit configured to read out compressed image data specified by said specification unit from said buffer memory, expand the compressed image data by said expansion unit, store the expanded image data in said buffer memory as the non-compressed image data, read out the non-compressed image data from said buffer memory, and allow to said display device to display the non-compressed image data when it is determined by the second determination unit that the image data specified by said specification unit is in the compressed image data stored in said buffer memory; and a third display control unit configured to read out compressed image data specified by said specification unit from said image memory, store the compressed image data in said buffer memory, expand the compressed image dat by said expansion unit, store the expanded image data in said buffer memory as the non-compressed image data, read out the non-compressed image data from said buffer memory, and allow said display device to display the non-compressed image data when it is determined by said second determination unit that the image data specified by said specification unit is not in the compressed image data stored in said buffer memory.

11. A method for controlling reproduction of an image in an electronic camera apparatus comprising (i) an image pick-up device configured to pick up an object to output image data, (ii) a compression unit configured to compress the image data output from said image pick-up device, (iii) an image memory configured to store the image data compressed by said compression unit, (iv) an expansion unit configured to expand compressed image data read out from said image memory, (v) a work memory configured to store the image data expanded by said expansion unit and the compressed image data read out from said image memory, and (vi) a display device configured to display expanded image data read out from said work memory, said method comprising:

specifying image data to be displayed on the display device;

determining whether the specified image data is in the expanded image data stored in said work memory;

reading out specified expanded image data from the work memory to display the expanded image data on the display device when it is determined that the specified image data is in the expanded image data;

determining whether the specified image data is in the compressed image data stored in said work memory when it is determined that the specified image data is not in the expanded image data;

reading out specified compressed image data from said work memory, expanding the compressed image data by said expansion unit, storing the expanded image data in said work memory, reading out the expanded image data from said work memory, and allowing said display device to display the expanded image data when it is determined that the specified image data is in the compressed image data stored in said work memory; and reading out specified compressed image data from said image memory, storing the compressed image data in said work memory, expanding the compressed image data by said expansion unit, storing the expanded imaged data in said work memory, reading out the expanded image data from said work memory and allowing said display device to display the expanded image data when it is determined that the specified image data is not in the compressed image data stored in said work memory.

12. A method for controlling reproduction of image in an electronic camera apparatus comprising (i) an image pick-up device configured to pick up an object to output image data, (ii) a compression unit configured to compress the image data output from said image pick-up device, (iii) a work memory configured to store non-compressed image data output from said image pick-up device and not yet compressed by said compression unit and to store the image data compressed by said compression unit, (iv) an image memory configured to store compressed image data read out from said work memory, (vi) an expansion unit configured to expand compressed image data read out from said image memory, and (vi) a display device configured to display non-compressed image expanded by said expansion unit, said method comprising:

specifying image data to be displayed on the display device;

determining whether the specified image data is in the non-compressed image data stored in said work memory;

reading out specified non-compressed image data from the work memory to display the non-compressed image data on the display device when it is determined that the specified image data is in the non-compressed image data;

determining whether the specified image data is in the compressed image data stored in said work memory when it is determined that the specified image data is not in the non-compressed image data;

reading out specified compressed image data from said work memory, expanding the compressed image data by said expansion unit, storing the expanded image data in said work memory as the non-compressed image data, reading out the non-compressed image data from said work memory, and allowing said display device to display the non-compressed image data when it is determined that the specified image data is in the compressed image data stored in said work memory; and reading out specified compressed image data from said image memory, storing the compressed image data in said work memory, expanding the compressed image data by said expansion unit, storing the expanded image data in said work memory as the non-compressed image data, reading out the non-compressed image data from said work memory, and allowing said display device to display the non-compressed image data when it is determined that the specified image data is not in the compressed image data stored in said work memory.

* * * * *